United States Patent [19]

Tipton et al.

[11] Patent Number: 5,115,920
[45] Date of Patent: May 26, 1992

[54] RACK

[75] Inventors: Richard E. Tipton, Jeffersontown; Paul S. Hart, Shepherdsville, both of Ky.

[73] Assignee: The Interlake Companies, Inc., Shepherdsville, Ky.

[21] Appl. No.: 556,820

[22] Filed: Jul. 20, 1990

[51] Int. Cl.⁵ .............................................. A47B 47/00
[52] U.S. Cl. .................................... 211/59.2; 211/151; 211/187; 108/111
[58] Field of Search ............... 211/187, 151, 153, 186, 211/59.2, 192; 108/111, 153

[56] References Cited

U.S. PATENT DOCUMENTS

| | | |
|---|---|---|
| 2,013,284 | 3/1932 | Michaud . |
| 3,871,525 | 3/1975 | Al-Dabbagh et al. . |
| 4,165,944 | 8/1979 | Sunasky .................... 211/192 X |
| 4,236,642 | 12/1980 | Klein . |
| 4,453,641 | 6/1984 | Rasmussen et al. ............ 211/151 |
| 4,461,388 | 7/1984 | Bustos ......................... 211/59.2 |
| 4,741,445 | 5/1988 | Klein . |
| 4,765,493 | 8/1988 | Kinney ........................ 211/59.2 |

FOREIGN PATENT DOCUMENTS

670336  9/1963  Canada ........................ 211/59.2

Primary Examiner—Blair M. Johnson
Attorney, Agent, or Firm—Theresa Fritz Camoriano

[57] ABSTRACT

A rack includes a shelf in which the means for connecting the shelf members together and for locking the shelf members together are integral with the shelf members.

9 Claims, 5 Drawing Sheets

RACK

The present invention relates to storage racks, and, in particular, to a novel arrangement for connecting together the shelf members of a rack.

Storage racks are well-known. These racks are used in warehouses and other places for storing pallets or packages. The racks are usually made up of frame members, which are rigidly connected together to form a frame, and shelf members, which are rigidly connected together to form a shelf, which is then hung on the frame. The shelves may be hung with the rear and front shelf members at the same height or with the rear shelf member higher than the front and may include rollers, so that packages can be loaded onto the rack from the back and can then ride on the rollers to the front of the rack. This latter type of rack is known as a carton flow rack. Many different arrangements are known for connecting together the side and front shelf members of a rack and for mounting rollers on a shelf. The successful arrangements all include some type of locking means so that the sides, front, and back of the shelf are rigidly and securely connected together. The means for mounting rollers usually requires that the rollers be mounted on a track which slides into grooves in the front and rear shelf members. The rear shelf member typically has a different cross-section from that of the front shelf member in order to provide room for the roller tracks to be slid into place. This means that two sets of tooling must be used and two different-shaped pieces must be kept in stock, creating greater expense than would be the case if the front and back were identical.

All of the common locking means for locking the shelf members together require that a separate piece be added to the members being connected together. For example, the separate piece may be a bolt which passes through holes in the members and is tightened in place. The two members may be fastened together by means of hooks and slots, and then a separate clip may be added to prevent the hooks from becoming unhooked. All of these connecting means involve the use of additional pieces which means greater cost, more difficult assembly, and the possibility that pieces will be lost, preventing proper assembly.

SUMMARY OF THE INVENTION

The present invention provides a rack which has locking means integral with the shelf members, so no additional locking member is required.

By using an integral locking member, the present invention provides a construction which is less expensive to manufacture than the prior art constructions.

The present invention provides a rack construction which is much simpler to assemble than racks of the prior art.

The present invention greatly reduces the problem of lost pieces in racks.

The present invention provides a means for mounting roller tracks which permits the front and rear shelf members to be identical. This saves on tooling costs and on the cost of stocking different parts.

BRIEF DESCRIPTION OF THE DRAWINGS

FIG. s is a perspective view of a rack made in accordance with the present invention.

DESCRIPTION OF THE PREFERRED EMBODIMENT

Figure 1:
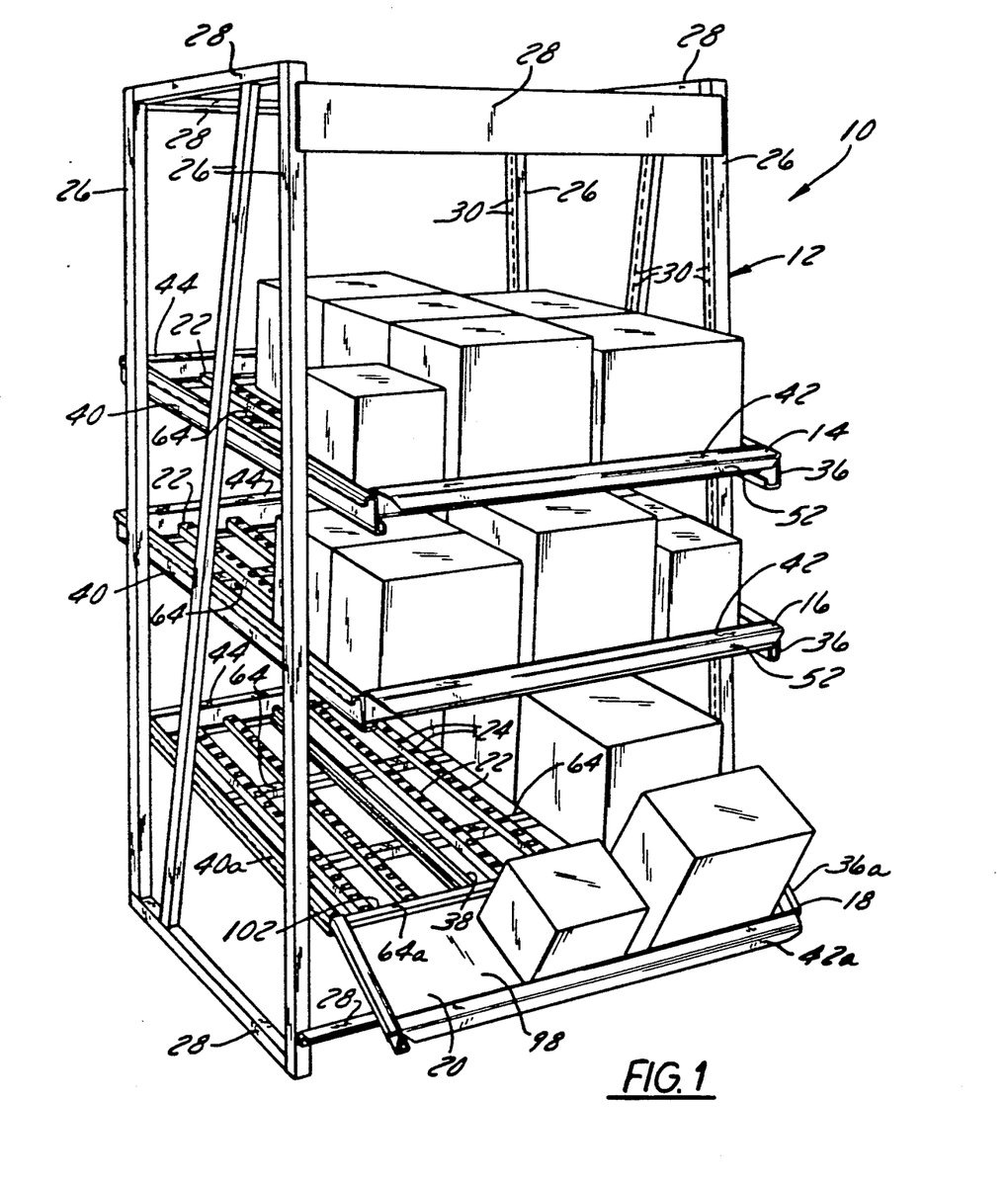
Figure 2:
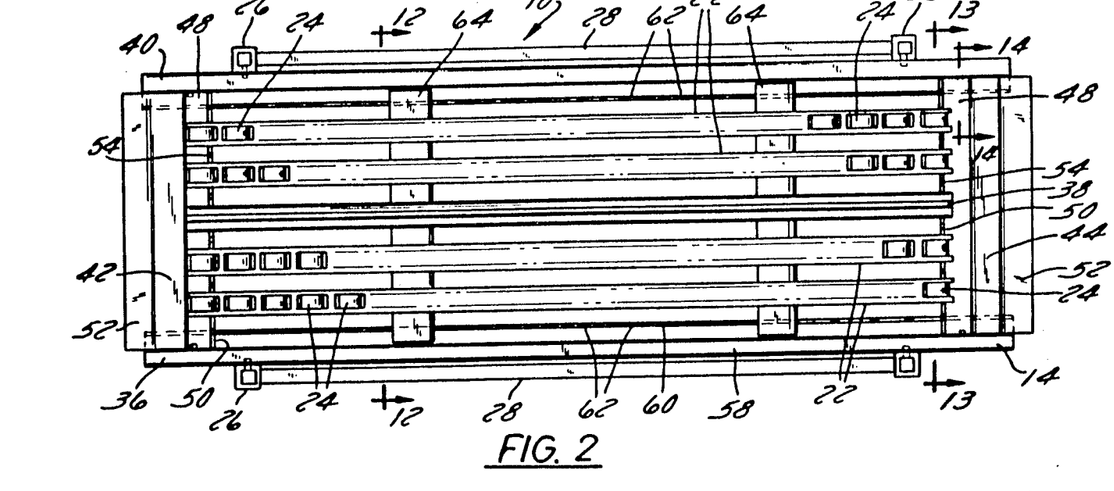
FIG. 2 is a top view thereof.

The rack 10 shown in FIG. 1 is made up of a frame 12, and three shelves 14, 16, and 18. The top shelf 14 and middle shelf 16 are identical to each other, and the bottom shelf 18 is a little different, in that it includes a tilted front portion 20.

Each shelf shown in FIG. 1 includes a number of roller tracks 22 with rollers 24 supported on the roller tracks 22. The rollers 24 permit the packages to move easily from the back of the shelf to the front of the shelf. This rack 10 is intended as an example of a typical arrangement of shelves, but racks could include more or fewer shelves, and each shelf may or may not include tilted front portions or rollers.

The rack 10 is made up of vertical frame members 26 and horizontal frame members 28, which are bolted together or welded together to form a rigid frame. The inside surface of the vertical frame members 26 has double rows of notches 30, which are used to support the shelves.

Figures 4, 5, 6, 6A:
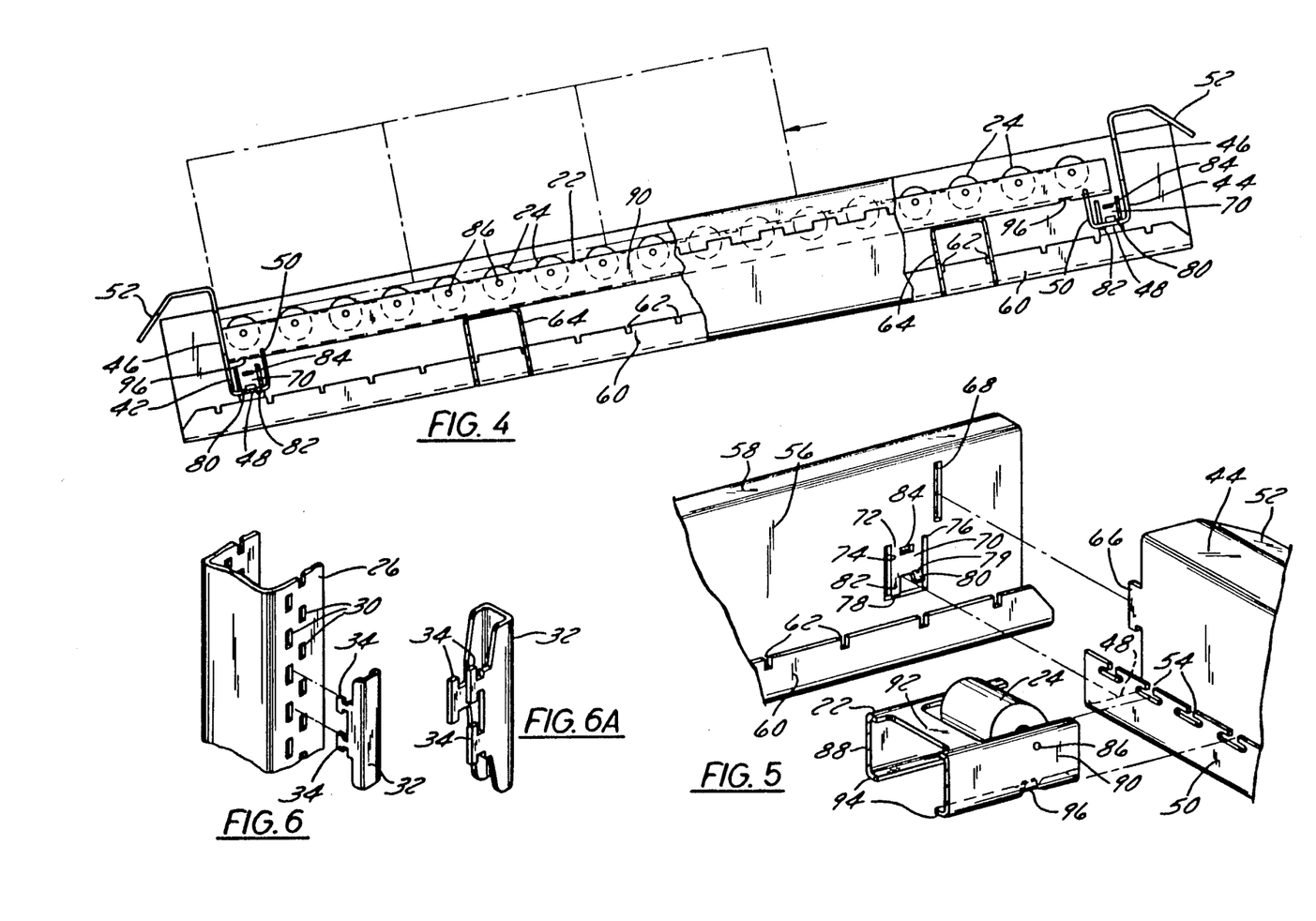
FIG. 4 is a side view partially in section of one shelf on the rack.
FIG. 5 is a broken-away exploded perspective view of the left side shelf member, the back shelf member, and one of the roller tracks.
FIG. 6 is a broken-away, exploded perspective view of a vertical frame member and clip which support the shelf.
FIG. 6A is a perspective view of the clip.

FIG. 6 shows a portion of one of the vertical frame members 26 and the notches 30 and a clip 32, which has projections 34 that fit into the notches 30 to hold the clip 32 on the vertical frame member 26. At least four of such clips 32 are used to support each shelf. The clips 32 are mounted on the vertical members 26 at the desired height, and then the shelf simply hooks onto the clips and hangs from the frame 12.

Figure 3:
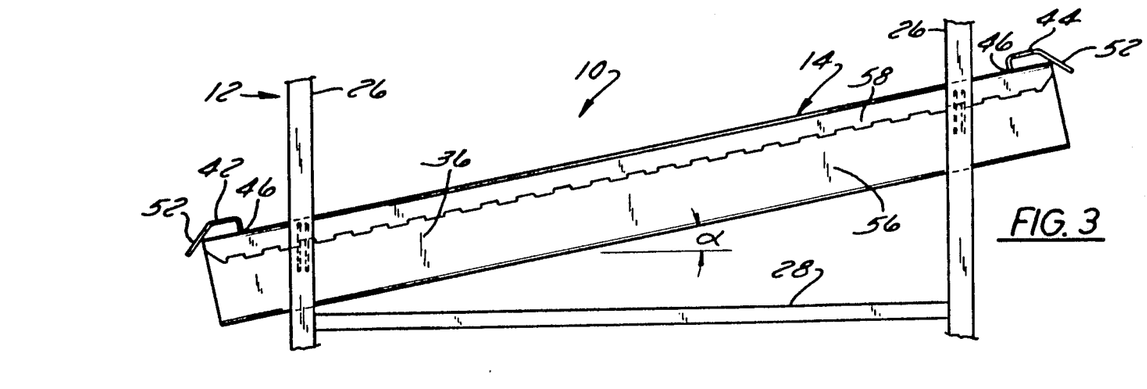
FIG. 3 is a broken-away side view thereof.

FIG. 3 shows a single shelf 14 mounted on the frame 12. The clips 32 cannot be seen in this view, because they are hidden behind the vertical members 26, but it is obvious from the position of the shelf 14 that the clips 32 are mounted on the vertical members 26 at different heights, with the front clips 32 mounted lower than the rear clips 32, and the right side beam 36 of the shelf 14 simply hooks over the top of the clips. The left side of the shelf 14 is mounted in the same way, so that the shelf 14 is mounted at an inclined angle alpha. Products can be loaded onto the shelf 14 from the rear and will then roll down the rollers 24 toward the front of the shelf 14 to be unloaded. This arrangement of using inclined shelves and rollers is desirable, because it provides a first-in-first-out arrangement, so there is a controlled turn-over of products.

As can be seen in FIGS. 2 and 11-13, in the center of the shelves 14, 16, 18 is a guide 38, which defines separate lanes and allows the cartons to flow properly toward the front of the rack. In most installations, a shelf would be wider than that shown in these drawings and would have several guides 38 at intervals along its width.

Figure 13:
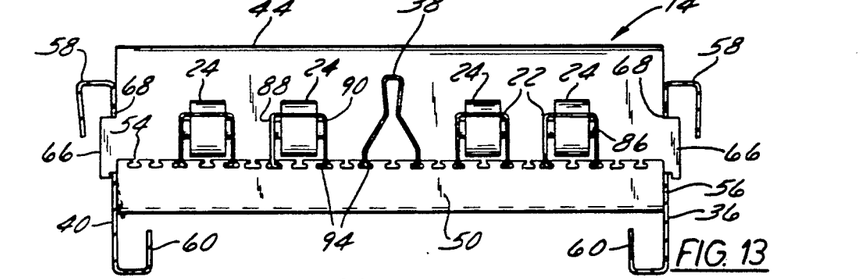
FIG. 13 is a view taken along the section 13—13 of FIG. 2.
Figure 14:
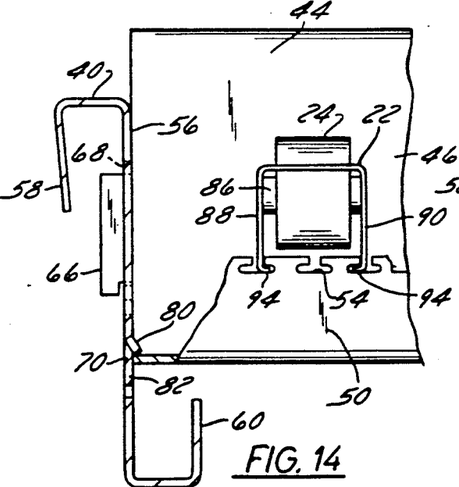
FIG. 14 is an enlarged, broken-away view of the left portion of the shelf shown in FIG. 13.

Each shelf 14, 16 is made up of a left beam 40, a right beam 36, a front beam 42, and rear beam 44. The cross-section of the front and rear beams 42, 44 can be seen in FIG. 4. The cross-section of both the front and rear beams 42, 44 includes a vertical portion 46, an inwardly-projecting portion 48 at the bottom of the vertical portion 46, and an upward extension 50 at the end of the inwardly-projecting portion 48. The cross-section of the front beam 42a on the bottom shelf 18 is slightly different from the front beams 42 of the other shelves 14, 16, in that it does not include the upward extension 50. At the top of the vertical portion 46 of the front and rear beams 42, 44 is an outwardly-extending lip 52. The front and rear beams 42, 44 also include angled slots 54 in their upward extension portions 50, as shown in FIGS. 5, 13 and 14, which are used to secure the roller tracks 22 to the shelf.

The cross-section of the left and right beams 40, 36 is shown in FIGS. 12-15. Both the left and right beams 40, 36 include a vertical face 56, a downwardly-curved leg 58 at the top of the vertical face 56, and an upwardly-curved leg 60 at the bottom of the vertical face 56. The downwardly-curved leg 58 fits over the top of the clip 32 to support the shelf on the frame 12. The upwardly-curved leg 60 has notches 62 along its top edge, as shown in FIG. 4, and is used to carry intermediate support members 64, which prevent the roller tracks 22 from sagging in the middle.

The front and rear beams 42, 44 have downwardly-hooking projections 66 extending from their left and right ends, and the vertical faces 56 of the left and right beams 40, 36 have vertical slots 68, which receive the hooks 66 to connect the ends of the beams together to form a rectangular shelf. The beams also include an integral locking means, which makes the connection between the beams more rigid and prevents the hooks from coming out of the slots. This integral locking means eliminates the need for a separate locking member as was required in prior art designs.

The integral locking means includes an integral vertical flap 70 which lies adjacent to each of the slots 68. The vertical flap 70 has a top edge 72 which is integral with the vertical face 56 of the left and right beams 40, 36, and the vertical flap 70 has left, right, and bottom edges 74, 76, 78, respectively, which are free from the vertical face 56. The bottom edge 78 of the vertical flap 70 is cut to form two legs, a shorter leg 80 and a longer leg 82. The shorter leg 80 is bent inwardly along the line 79 at a slight angle from the vertical.

Figure 15:
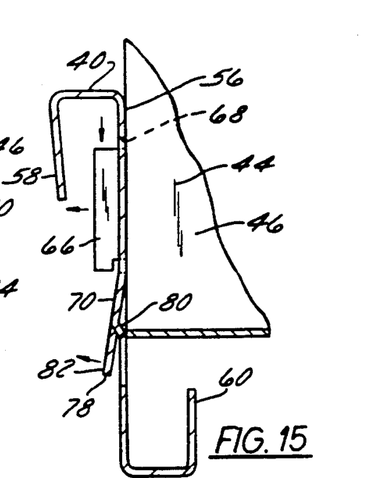
FIG. 15 is the same view as FIG. 14, with the hook portion lifted upward to show how it is inserted into the slot.

The manner in which the vertical flap 70 functions can be seen best in FIGS. 14 and 15. FIG. 14 shows that, when the hook 66 of the rear beam 44 is inserted into the slot 68 in the left beam 40 until the hook 66 reaches the bottom of the slot 68, the inwardly-bent portion 79 of the shorter leg 80 of the vertical flap 70 is just above the inwardly-projecting portion 48 of the rear beam 44. If a force is applied to the rear beam 44 trying to lift the rear beam 44 upward relative to the left beam 40, the shorter leg 80 will contact the inwardly-projecting portion of the rear beam 44, preventing the rear beam 44 from moving up. Since the rear beam 44 must move up relative to the left beam 40 in order for the hook 66 to be removed from the slot 68, the shorter leg 80 prevents the rear beam 44 and left beam 40 from being disassembled once they are assembled. This same connecting and locking arrangement is used at each corner of the rectangular shelf.

The longer leg 82 extends below the inwardly-projecting portion 48 of the rear beam 44 and contacts the left end of the inwardly-projecting portion 48. This prevents the vertical flap 70 from flexing inward.

The rear beam 44 and left beam 40 are connected together as shown in FIG. 15. The downwardly-hooking projection 66 on the left end of the rear beam 44 is moved toward the left until it enters the vertical slot 68 on the left beam 40. Then the rear beam 44 is moved downward. As the rear beam 44 is moved downward relative to the left beam 40, the inwardly-projecting portion 48 of the rear beam 44 contacts the inwardly-bent short leg 80 on the vertical flap 70. The force of the rear beam 44 acting on the slight angle of the inwardly-bent short leg 80 causes the vertical flap 70 to flex outward, allowing the inwardly-projecting portion 48 of the rear beam 44 to get past the short leg 80. When the hook 66 has reached the bottom of the slot 68, the rear beam 44 has moved down far enough that it has passed the short leg 80 and no longer pushes the short leg 80 outward. The vertical flap 70 then returns to its vertical position, with the short leg 80 located directly above the inwardly-projecting portion 48 of the rear beam 44.

This connecting and locking arrangement is used at all four corners of the rectangular shelf until the entire shelf is assembled.

There is an opening 84 in the vertical flap 70, which can be used for disassembling the shelf. The opening 84 can receive a screwdriver or other tool which can be used to pry the vertical flap 70 outward, which permits the rear beam to move upward past the shorter leg 80, so the rear beam 44 can be lifted up relative to the left beam, and the hook 66 can be removed from its slot 68.

The mounting arrangement for the rollers 24 is as follows: The rollers 24 are mounted on axles 86, and the ends of the axles 86 are mounted in the left and right rails 88, 90. Upper strips 92 connect the left rail 88 and right rail 90 together, and there are spaces between the strips 92, through which the tops of the rollers 24 project. The rollers 24, rails 88, 90, and strips 92 form the roller track 22. The cross-section of the rails 88, 90 can be seen in FIG. 14. The rails 88, 90 are primarily vertical but include an angled portion 94 at their bottom edge. This angled portion 94 fits into the corresponding angled slots 54 of the upward extension 50 of the front and rear beams 42, 44 to secure the track 22 to the shelf. It can be seen in FIGS. 5, and 8-10 that there are small discontinuities 96 in the angled cross-section of the rails 88, 90 near both ends. The discontinuities 96 are formed by crimping or flattening the angled portion 94. These discontinuities 96 permit the track 22 to be installed without requiring that it be slid backwards into the rear frame member 44 and then forward into the front frame member 42, as was required in the prior art design. The prior method of installation required that the front and rear beams 42, 44 have different cross-sections so that the rear beam 44 had enough depth to receive the track as it was slid backward. This meant that the rear beam and the front beam could not be identical, requiring separate tooling to produce the front and back beams, and requiring that two different beams be stocked. All of this additional expense and inconvenience is eliminated by the present design.

In order to install the track on the shelf, the discontinuities on the front and rear of the track are aligned with the angled slots 54 on the front and rear beams, 42, 44, and the rails are pushed downward until the angled portions 94 of the rails 88, 90 are aligned with the angled slots 54 in the front and rear beams 42, 44. At this point, the back end of the track 22 is very close to the vertical portion 46 of the rear rail 44. Then, the track is slid forward a short distance, so that the angled portion 94 of the rails 88, 90 enters the angled slots 54 of the front and rear beams 42, 44, and is slid forward a bit more, until the front end of the track 22 contacts the vertical portion 46 of the front beam 42. At this point, the track 22 is secured on the shelf. The angled slots 54 on the front and rear beams 42, 44 prevent the track from moving up or down relative to the shelf, and the track is as far forward as it can go. The only direction the track 22 could move is backward, and, since it is inclined downward from back to front and all the packages move from back to front, no force is ever applied to the track to move it in the backward direction. It would be possible to accomplish the same type of installation with discontinuities 96 only near the rear end of the rails 88, 90, but this would leave a bit larger gap between the back end of the rails 88, 90 and the vertical portion 46 of the rear beam 44 after installation of the track. downward from back to front and all the packages move from back to front, no force is ever applied to the track to move it in the backward direction.

The guide 38 has the same kind of angled portion 94 as the roller tracks and mounts onto the angled slots 54 in the front and rear beams 42, 44 in the same manner as the roller tracks.

Figure 7:
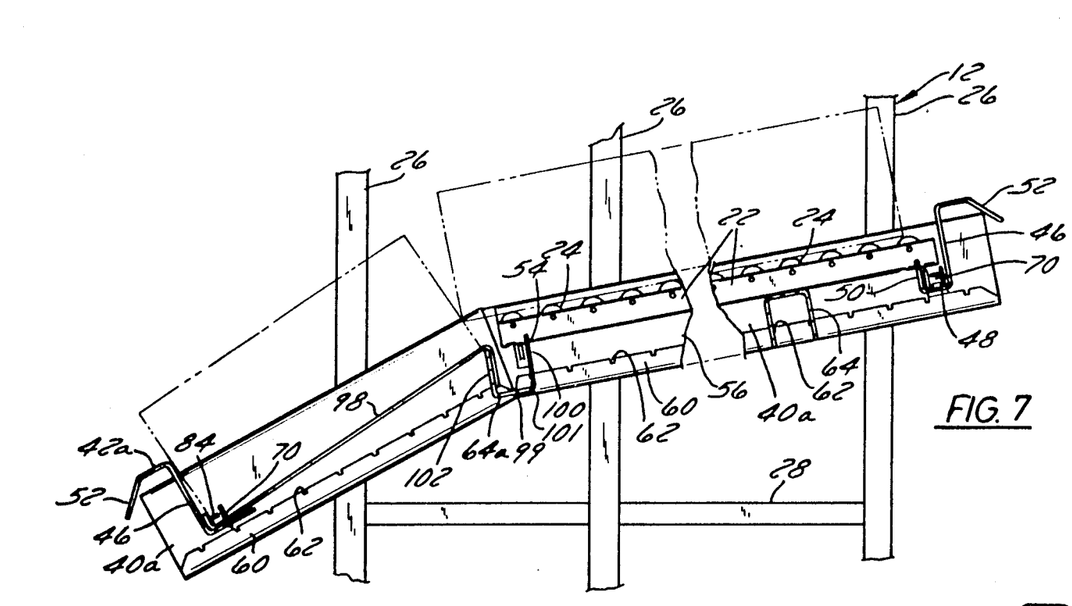
FIG. 7 is a side view partially in section of a lower portion of the rack, with packages shown in phantom.
Figure 8:
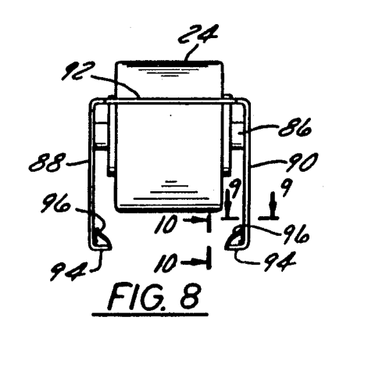
FIG. 8 is a front view of a roller track which has been removed from its shelf.
Figures 9, 10:
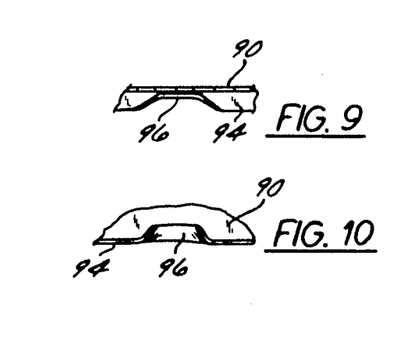
FIG. 9 is a view taken along the section 9—9 of FIG. 8.
FIG. 10 is a view taken along the line 10—10 of FIG. 8.
Figure 10A:
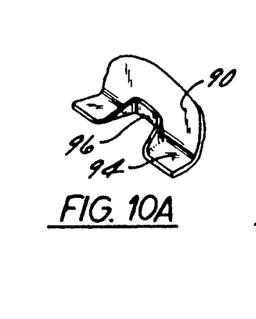
FIG. 10A is a broken-away perspective view of the portion of the roller track shown in FIGS. 9 and 10.
Figure 11:
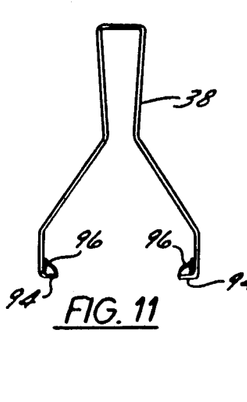
FIG. 11 is a front view of the center divider which has been removed from its shelf.
Figure 12:
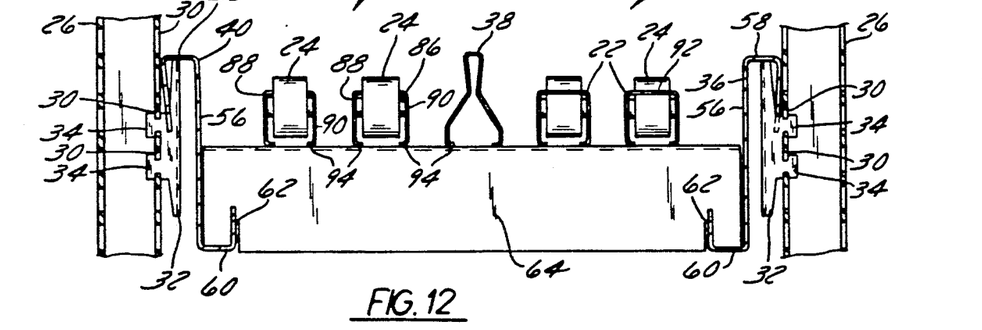
FIG. 12 is a broken-away view taken generally along the section 12—12 of FIG. 2, showing the vertical frame members, the clips, and a shelf.

The lowermost shelf 18 is slightly different from the shelves that have already been described, because it has a tilted front portion 20, which makes it easier for people working in a warehouse to pick up articles out of the boxes on the rack. As was mentioned earlier, this type of shelf could be located at any height on the rack and, in fact, all the shelves could be of this type, depending upon the 15 installation. The left and right side beams 40a, 36a on the lowest shelf 18 are the same as in the other shelves, except that they have been formed at an angle. This is intended to be accomplished by cutting a triangular section out of each side beam, forming the beam, and then welding the remaining cut edges together. The front and rear beams 42a, 44 connect to the side beams in the same way as on the other shelves. A special type of intermediate support member 64a is used in the angled area. This special intermediate support member 64a has slots 99 near both ends of its web portion 101 which permit it to fit down over the upwardly-curved portion 60 of the two side beams 36, 40. These slots 99 permit the rear leg 100 of the intermediate support member 64a to be caught in a notch 62 on each of the side beams 36a, 40a. The front leg 102 of the special intermediate support member 64a rests on the upwardly-curved side portions 60 of the tilted portion 20. The intermediate support member 64a has the same angled slots 54 in its rear leg 100 as do the front and rear beams 42, 44 in the other shelves, and it supports the roller tracks 22 and divider 38 in the same manner as the front beam 42 on the other shelves. A piece of sheet metal 98 is bent at its back edge, which fits over the front leg 102 of the special intermediate support 64a. The front edge of the sheet metal 98 abuts the front beam 42a. This piece of sheet metal serves as the floor of the angled portion of the shelf.

It will be obvious to those skilled in the art that modifications may be made to the embodiment described above without departing from the scope of the present invention.

What is claimed is:

1. A shelf for a hanging rack system, comprising:
  a front beam;
  a rear beam;
  a left side beam;
  a right side beam; and
  connecting means integral with said beams for connecting each of said beams to an adjacent beam at substantially right angles to form a rectangular shelf having an inside and an outside;
  said connecting means comprising:
  a downwardly-hooking projection extending from the end of one of said beams;
    a vertical face on the beam adjacent to said one beam, said vertical face defining a vertical slot which receives said downwardly-hooking projection; and
    locking means integral with the beams for stopping the downwardly-hooking projection from moving upward relative to the vertical slot once the downwardly-hooking projection has been inserted into the slot;
  wherein said locking means includes an inwardly-projecting portion on said one beam and an integral vertical flap defined on said vertical face; said integral vertical flap having a top edge which is integral with the vertical face and having two side edges and a bottom edge which are free from the vertical face, with at least a portion of the bottom edge of the vertical flap being bent inward and located such that, as the downwardly-hooking projection of the one beam is being inserted into the vertical slot of the adjacent beam and pushed to the bottom of the slot, the inwardly-projecting portion of the one beam contacts the flap and causes the flap to flex outward, permitting the inwardly-projecting portion of the one beam to pass the inwardly-bent bottom edge portion of the flap, and, once the downwardly-hooking projection has reached the bottom of the slot, the flap returns to its vertical position, and the inwardly-bent bottom edge portion of the vertical flap lies above the inwardly-projecting portion of the one beam, serving as a stop to prevent the one beam from moving upwardly relative to the slot.

2. A shelf as recited in claim 1, wherein the bottom edge of said vertical flap is cut so as to form two legs, one shorter leg and one longer leg, with the shorter leg being bent inward and lying above the inwardly-projecting portion of the one beam when the beams are assembled, and the longer leg abutting the end of the inwardly-projecting portion of the one beam, to prevent the vertical flap from flexing inward.

3. A shelf as recited in claim 1, wherein the vertical flap defines an opening for receiving a tool to flex the vertical flap outward for disassembly of the shelf.

4. A shelf for a hanging rack system, comprising:
   a front beam;
   a rear beam;
   a left side beam;
   a right side beam; and
   connecting means integral with said beams for connecting each of said beams to an adjacent beam at substantially right angles to form a rectangular shelf having an inside and an outside;
   said connecting means comprising:
   a downwardly-hooking projection extending from the end of one of said beams;
   a vertical face on the beam adjacent to said one beam, said vertical face defining a vertical slot which receives said downwardly-hooking projection; and
   locking means integral with the beams for stopping the downwardly-hooking projection from moving upward relative to the vertical slot once the downwardly-hooking projection has been inserted into the slot;
   and further comprising a roller track, including left and right rails and a plurality of rollers supported on the left and right rails, said rails having an angled cross-section;
   wherein said front and rear beams define angled slots which correspond to the shape of said angled cross-section to receive the ends of said rails; and wherein there is at least one discontinuity in the cross-section of each rail near one end, said discontinuity permitting the track to be slid downward onto the rear beam to align the angled cross-section of the rails with the angled slots in the front and rear beams, and then to be slid in the direction of the front beam, so that the angled tracks are received in their respective angled slots in the front and rear beams and are thereby prevented from being moved upward and downward relative to the beams.

5. A rack, comprising:
   a frame, at least one shelf, and means for hanging said shelf on said frame, said shelf including left, right, front and rear shelf beams; and connecting means integral with said beams for connecting reach of said beams to its adjacent beam to form a rectangle having an inside and an outside; said connecting means comprising:
   a downwardly-hooking projection extending from the end of one of said beams;
   a vertical face on the beam adjacent to said one beam, said vertical face defining a vertical slot which receives said downwardly-hooking projection; and
   locking means integral with the beams for stopping the downwardly-hooking projection from moving upward relative to the vertical slot once the downwardly-hooking projection has been inserted into the slot;
   wherein said locking means comprises:
   said one beam having an inwardly-projecting portion; and
   said vertical face defining an integral vertical flap having a top edge which is integral with the vertical face and having two side edges and a bottom edge which are free from the vertical face, with at least a portion of the bottom edge of the vertical flap being bent inward and located such that, as the downwardly-hooking projection of the one beam is being inserted into the vertical slot of the adjacent beam and pushed to the bottom of the slot, the inwardly-projecting portion of the one beam contacts the flap and causes the flap to flex outward, permitting the inwardly-projecting portion of the one beam to pass the inwardly-bent bottom edge portion of the flap, and once the downwardly-hooking projection has reached the bottom of the slot, the flap returns to its vertical position, and the inwardly-bent bottom edge portion of the vertical flap lies above the inwardly-projecting portion of the one beam, serving as a stop to prevent the one beam from moving upward relative to the slot.

6. A rack as recited in claim 5, wherein the bottom edge of said vertical flap is cut so as to form two legs, one shorter leg and one longer leg, with the shorter leg being bent inward and lying above the inwardly-projecting portion of the one beam when the beams are assembled, and the longer leg abutting the end of the inwardly-projecting portion of the one beam, to prevent the vertical flap from flexing inward.

7. A rack as recited in claim 5, wherein the vertical flap defines an opening for receiving a tool to flex the vertical flap outward for disassembly of the shelf.

8. A rack, comprising:
   a frame, at least one shelf, and means for hanging said shelf on said frame, said shelf including left, right, front and rear shelf beams; and connecting means integral with said beams for connecting each of said beams to its adjacent beam to form a rectangle having an inside and an outside; said connecting means comprising:
   a downwardly-hooking projection extending from the end of one of said beams;
   a vertical face on the beam adjacent to said one beam, said vertical face defining a vertical slot which receives said downwardly-hooking projection; and
   locking means integral with the beams for stopping the downwardly-hooking projection from moving upward relative to the vertical slot once the downwardly-hooking projection has been inserted into the slot;
   and further comprising a roller track including left and right rails and a plurality of rollers supported on the left and right rails, said rails having an angled cross-section;
   wherein said front and rear beams define angled slots which correspond to the shape of said angled cross-section to receive the ends of said rails; and wherein there is at least one discontinuity in the cross-section of each rail near one end, said discontinuity permitting the track to be slid downward onto the rear beam to align the angled cross-section of the rails with the angled slots in the front and rear beams, and then to be slid in the direction of the front of the beam, so that the angled tracks are received in their respective angled slots in the front and rear beams and are thereby prevented from being moved upward and downward relative to the beams.

9. A shelf for a hanging rack system, comprising:
   a front beam, rear beam, left side beam, and right side beam connected together to form a frame, wherein the front and rear beams defined a plurality of angled slots for receiving roller tracks;

a plurality of roller tracks, each of said roller tracks including left and right rails and a plurality of rollers mounted on said left and right rails, wherein said left and right rails have angled cross-sections adapted to be receive din said angled slots;

said left and right rails each defining at least one discontinuity near their backs ends, said discontinuity permitting the track to be slid downward onto the rear beam to align the angled cross-section of the rails with the angled slots in the front and rear beams, and then to be slid in the direction of the front beam, so that the angled tracks are received in their respective slots in the front and rear beams and are thereby prevented from being moved upward and downward relative to the beams.

* * * * *